United States Patent
Holden

(10) Patent No.: US 7,204,871 B2
(45) Date of Patent: Apr. 17, 2007

(54) METAL PLATING PROCESS

(75) Inventor: Richard J. Holden, Richmond, MI (US)

(73) Assignee: Wolverine Plating Corp., Roseville, MI (US)

( * ) Notice: Subject to any disclaimer, the term of this patent is extended or adjusted under 35 U.S.C. 154(b) by 0 days.

(21) Appl. No.: 11/136,291

(22) Filed: May 24, 2005

(65) Prior Publication Data

US 2006/0266257 A1    Nov. 30, 2006

(51) Int. Cl.
*C09D 5/08* (2006.01)
*C23C 22/40* (2006.01)
*C23F 11/04* (2006.01)
*B05D 1/18* (2006.01)

(52) U.S. Cl. .............. 106/14.21; 106/1.22; 106/1.25; 106/286.1; 427/437; 427/443.1; 427/419.1; 148/243

(58) Field of Classification Search ............. 106/1.22, 106/1.25, 286.1, 14.21; 427/437, 443.1, 427/419.1; 148/243
See application file for complete search history.

(56) References Cited

U.S. PATENT DOCUMENTS

| | | | | |
|---|---|---|---|---|
| 1,798,218 | A | 3/1931 | Pacz | 205/320 |
| 2,219,977 | A | 10/1940 | Brill | 148/6 |
| 2,650,903 | A | 9/1953 | Garrison et al. | 205/195 |
| 2,805,969 | A | 9/1957 | Goodspeed et al. | 148/6.14 |
| 2,835,616 | A | 5/1958 | Rausch et al. | 149/6.14 |
| 3,404,044 | A | 10/1968 | Russell | 148/6.2 |
| 3,528,860 | A | 9/1970 | Kronstein | 148/6.15 |
| 3,935,345 | A | 1/1976 | Lema | 427/383 |
| 4,298,404 | A * | 11/1981 | Greene | 148/247 |
| 4,385,940 | A | 5/1983 | Kirihara et al. | 148/6.15 R |
| 4,985,097 | A * | 1/1991 | Matsumura et al. | 156/87 |
| 5,525,431 | A * | 6/1996 | Kanamaru et al. | 428/623 |
| 5,700,334 | A | 12/1997 | Ishii et al. | 148/273 |
| 5,743,971 | A | 4/1998 | Inoue et al. | 148/247 |
| 6,027,578 | A | 2/2000 | Marzano | 148/243 |
| 6,083,309 | A | 7/2000 | Tomlinson | 106/14.21 |
| 6,309,476 | B1 | 10/2001 | Ravenscroft et al. | 148/252 |
| 6,524,403 | B1 * | 2/2003 | Bartlett et al. | 148/247 |
| 6,740,361 | B1 | 5/2004 | Bibber | 427/388.1 |
| 6,773,516 | B2 | 8/2004 | Hardin et al. | 148/243 |
| 2003/0079807 | A1 | 5/2003 | Ravenscroft et al. | 148/243 |
| 2003/0230363 | A1 | 12/2003 | Sturgill et al. | 148/243 |

FOREIGN PATENT DOCUMENTS

JP    53/016328    *    2/1978
JP    362180081 A        8/1987

OTHER PUBLICATIONS

Derwent abstract of JP 53/016328, Feb. 1978.*
English translation of JP53/016328, Feb. 1978.*
Aldoa Technical Bulletin (undated)/Material Safety Data Sheet (Oct. 2001) for Aldokote BZN non chromium black on zinc/zinc-nickel alloy plating.
Aldoa Technical Bulletin (undated)/Material Safety Data Sheet (Jul. 2001) for Aldokote NCB non chromium black on zinc deposits.
Short et al. "An Investigation into the Oxidation State of Molybdenum in Simplified High Level Nuclear Waste Glass Compositions" (undated).

* cited by examiner

*Primary Examiner*—Helene Klemanski
(74) *Attorney, Agent, or Firm*—Gifford, Krass, Sprinkle, Anderson & Citkowski, P.C.

(57) ABSTRACT

A process for forming a coating on a metal substrate includes contacting the substrate with a molybdate solution having a pH of between 3.5 and 5 inclusive containing an acid with the proviso that the acid is not nitric acid. The substrate is contacted with the solution at a temperature between 30 and 75 degrees Celsius and results in a yellow coating that is kinetically stable from 20 seconds to 300 seconds before the coating darkens to a final black coloration. Water washing of the yellow coating precludes further color development. The resulting yellow coating is amenable to overlayering with a seal coat.

16 Claims, No Drawings

METAL PLATING PROCESS

FIELD OF THE INVENTION

The present invention in general relates to a metal plating process for obtaining a yellow plated surface and in particular to a process for obtaining a yellow plated surface that is free of chromium.

BACKGROUND OF THE INVENTION

Traditionally, many exposed automotive components are chrome-plated to provide an anti-corrosion coating and an aesthetic quality to the underlying steel component. Based upon the details of the chromium coating process, a steel component accepted a yellow or black hue or took on a silver-mirrored appearance.

In recent years, the toxic and environmental degradation associated with the handling and disposal of chromium and its precursors has become known. In particular, hexavalent chromium salts are recognized to be particularly deleterious. In spite of the need to eliminate chromium from automotive steel plating, a desire remains to have the cosmetic qualities of a chromium yellow and chromium black finish. While it is well known that acidic molybdenum salt solutions can plate a black surface layer onto steels having a zinc, zinc-nickel, or zinc-chloride treated surface, formation of a suitable surface finish yellow coating has proven considerably more difficult.

Thus, there exists a need for a process that provides a yellow hued coating on zinc treated steel that is chromium free.

SUMMARY OF THE INVENTION

A process for forming a coating on a metal substrate includes contacting the substrate with a molybdate solution having a pH of between 3.5 and 5 inclusive containing an acid with the proviso that the acid is not nitric acid. The substrate is contacted with the solution at a temperature between 30 and 75 degrees Celsius and results in a yellow coating that is kinetically stable from 20 seconds to 300 seconds before the coating darkens to a final black coloration. Water washing of the yellow coating precludes further color development. The resulting yellow coating is amenable to overlayering with a seal coat.

DETAILED DESCRIPTION OF THE PREFERRED EMBODIMENTS

The present invention has utility to produce a yellow colored surface coating, the inventive coating having an appearance similar to that obtained with chromium(VI) or chromium(III) plating baths with the advantage that molybdenum represents a more benign substance for handling and disposal.

The inventive process for forming a coating requires a substrate to be formed of a metal tolerant of brief immersion in a pH 3.5 to 5 coating solution. Metal substrates operative herein illustratively include iron, steel, tin, aluminum, nickel, zinc, magnesium and combinations thereof in the form of plated substrates. Plated substrates illustratively include galvanized steel, zinc plated steel, and zinc-nickel plated steel. Zinc plated steel and zinc-nickel plated steel represent particularly preferred substrates for the production of external automotive accents.

A solution employed in an inventive coating process is prepared by dissolving a water soluble molybdate in hot water to yield a solution having a molybdate concentration of between 0.01 and 0.2 mols per liter [corresponds to 0.4 to 4 ounces per gallon of ammonium molybdate tetrahydrate]. Preferably, the molybdate is present from 0.05 to 0.1 molar. Suitable molybdate compounds include sodium, potassium, lithium and ammonium molybdate salts. Since the salts are dissolved in water, it is preferred that molybdate salt hydrates are used to speed dissolution and provide easier handling as compared to an anhydrous salt. Ammonium molybdate tetrahydrate is a preferred molybdate salt. Alternatively, molybdenum halides and oxyhalides soluble in aqueous acidic solutions and having a molybdenum 6+ oxidation state are also operative herein and are characterized by the formula $M0(VI)O_mX_n$ where X is in each instant independently fluorine, chlorine or bromine; m is an integer value of 1 or 2; n is an integer value of 2 or 4; $2m+n=6$; and y is an integer value of 1 or 2.

The pH of the resulting solution is adjusted to a pH of between 3.5 and 5. Preferably, the pH is adjusted to between 4 and 5. The acid used to adjust the pH is any mineral acid or organic acid with the exception that nitric acid develops to a black coating too quickly to satisfy the requirements of the present invention. After coating a substrate made of, or coated with a metal such as iron, steel, tin, aluminum, zinc, nickel or alloys thereof, the substrate is cleaned by conventional techniques and immersed in inventive solution at a temperature ranging from 30 to 75 degrees Celsius and monitored for the appearance of a yellow coating coloration. Preferably, the temperature is between 35 and 50 degrees Celsius when the substrate is zinc-nickel plate. In the alternative, the temperature of the bath is between 65 and 75 degrees Celsius when the substrate is a galvanized steel. The yellow coating developing after about 20 seconds to about 300 seconds after contact with the molybdenum containing solution. As a general rule, the lower the coating solution temperature and higher the coating solution pH, the slower the yellow coating develops. In contrast to the inventive process, conventional molybdenum plating on zinc or zinc-nickel alloy goes through a series of color changes from yellow to purple to black with the desired yellow coating color only lasting on the order of about 1 second. Development of a yellow coating at a rate slow enough to allow for rinsing to cease color development is an innovation of the present invention.

An inventive coating solution optionally includes plating adjuvants such as electrolytes, pH buffers and compatible secondary plating compounds. Electrolytes operative herein include salts of acids present and illustratively include sodium chloride, and sodium acetate. An electrolyte operative with the inventive process includes any compound that is soluble in coating solution and increase the electrical conductivity of the resulting solution. Electrolytes operative herein illustratively include alkali metal salts, alkali earth salts, transition metal salts, and detergents. It is appreciated that a pH buffering agent can simultaneously also operate as an electrolyte. The secondary plating compound illustratively includes an aqueous acidic solution soluble metal salt such as nickel chloride. In the instances when a secondary coating compound is present, the secondary coating compound is intended to form interspersed coating deposits in an otherwise molybdenum-oxide or -hydroxide coating. Typically, a buffer or electrolyte is present from 0 to 10 weight percent of the coating solution. A secondary coating compound is present from 0 to 2 percent.

Following the development of a yellow coating according to the present invention, further color change to purple or even to black is precluded by removing the substrate from the coating bath and rinsing the substrate with water. Without intending to be limited to a particular theory, yellow coatings produced by the present invention are believed to be the result of hexavalent molybdenum oxide or hydroxide species. Molybdenum(V) and molybdenum(III) species are known to correspond to the successive darker colors observed in conventional molybdenum black deposits. The present invention by slowing the rate of molybdenum oxidation change affords a yellow coating kinetically stable enough to be isolated.

Subsequent to rinsing a substrate so as to retain the yellow coating, the substrate and yellow coating are dried or over layered with a seal coat. A seal coat operative with the present invention includes a variety of conventional seal coats illustratively including silanization of the yellow coating followed by adhesion of silica, acrylic clear coats, polyurethane, lacquer, and other conventional clear coats.

The present invention is further detailed with respect to the following non-limiting examples.

EXAMPLE 1

A zinc-nickel alloy plate coated lug nut is placed in a 0.05 molar solution of ammonium molybdate acidified to a pH of 4 with hydrochloric acid and maintained at 43 degrees Celsius. The lug nut takes on a yellow appearance after 25 seconds. The lug nut is removed and rinsed with fresh water and dried. A stable uniform yellow hued coating results.

EXAMPLE 2

The process of Example 1 was repeated with the coating solution pH increased to pH 5 and the temperature reduced to 35 degrees Celsius. A comparable yellow hued lug nut resulted after 90 seconds.

COMPARATIVE EXAMPLE

The process of Example 1 was repeated with a pH of 2.5 and a coating solution temperature of 60 degrees Celsius. A yellow coating was observed for about 1 second followed by progression through green, brown, purple and finally a black coloration after about 1 minute.

The foregoing description is illustrative of particular embodiments of the invention, but is not meant to be a limitation upon the practice thereof. One skilled in the art will readily appreciate modifications and variations to the present invention that nonetheless remain within the spirit of the invention. These modifications and variations are intended to be encompassed by the appended claims.

The invention claimed is:

1. A process for forming a coating on a metal substrate comprising: contacting the substrate with a molybdenum-containing solution having a pH of between 3.5 and 5, inclusive, and containing an acid, with the proviso that the acid is not nitric acid at a temperature between 30 and 75 degrees Celsius such that a yellow coating develops from between 20 and 300 seconds after contact therewith wherein molybdenum is the only metal responsible for the yellow coating and present within said solution as a molybdate or $MO(VI)Q_mX_n$ where X is in each instant independently fluorine, chlorine or bromine; m is an integer value of 1 or 2; and n is an integer value of 2 or 4; 2m+n=6.

2. The process of claim 1 wherein said solution is independent of chromium.

3. The process of claim 1 wherein said molybdenum containing solution has a molybdenum ion concentration of between 0.05 and 0.2 molar.

4. The process of claim 1 wherein said acid is hydrochloric acid.

5. The process of claim 1 wherein the temperature is between 35 and 50 degrees Celsius and said substrate is zinc-nickel plate.

6. The process of claim 1 wherein the temperature is between 65 and 75 degrees Celsius and said substrate is galvanized steel.

7. The process of claim 1 wherein said solution further comprises an adjuvant selected from the group consisting of: a buffer and an electrolyte.

8. A process for forming a coating on a metal substrate comprising:
    contacting the substrate with a molybdenum-containing solution having a pH of between 3.5 and 5, inclusive, and containing an acid, with the proviso that the acid is not nitric acid at a temperature between 30 and 75 degrees Celsius such that a yellow coating develops from between 20 and 300 seconds after contact therewith wherein molybdenum is the only metal responsible for the yellow coating and present within said solution as a molybdate or $Mo(VI)O_mX_n$ where X is in each instant independently fluorine, chlorine or bromine; m is an integer value of 1 or 2; and n is an integer value of 2 or 4; 2m+n=6; and
    rinsing the substrate after the yellow coating develops and before the yellow coating changes to a darker color.

9. The process of claim 8 further comprising overlaying a clear coat onto the yellow coating.

10. The process of claim 8 wherein said solution is independent of chromium.

11. The process of claim 8 wherein said molybdenum containing solution has a molybdenum ion concentration of between 0.05 and 0.2 molar.

12. The process of claim 8 wherein said acid is hydrochloric acid.

13. The process of claim 8 wherein the temperature is between 35 and 50 degrees Celsius and said substrate is zinc-nickel plate.

14. The process of claim 8 wherein the temperature is between 65 and 75 degrees Celsius and said substrate is galvanized steel.

15. The process of claim 8 wherein said solution further comprises an adjuvant selected from the group consisting of: a buffer and an electrolyte.

16. A coating bath for forming a yellow coating on a metal substrate comprising:
    water;
    molybdenum ions present from 0.05 to 0.2 molar in said water;
    an acid present to yield a pH of between 3.5 and 5, inclusive, with the proviso that the acid is not nitric acid; and
    said bath at a temperature between 30 and 75 degrees Celsius;
    wherein said molybdenum ion is derived from $Mo(VI)O_mX_n$ where X is in each instant independently fluorine, chlorine or bromine; m is an integer value of 1 or 2; and n is an integer value of 2 or 4; 2m+n=6.

* * * * *

UNITED STATES PATENT AND TRADEMARK OFFICE
CERTIFICATE OF CORRECTION

PATENT NO.       : 7,204,871 B2
APPLICATION NO.  : 11/136291
DATED            : April 17, 2007
INVENTOR(S)      : Richard J. Holden It is certified that error appears in the above-identified patent and that said Letters Patent is hereby corrected as shown below:

Column 2, line 41, Replace, "molybdenum ptating" with -- molybdenum plating --

Column 3, line 65, Replace, "$M0(VI)Q_mX_n$" with -- $M0(VI)O_mX_n$ --

Signed and Sealed this

Sixteenth Day of October, 2007

JON W. DUDAS
*Director of the United States Patent and Trademark Office*